US012787971B2

(12) United States Patent
Li

(10) Patent No.: US 12,787,971 B2
(45) Date of Patent: Nov. 10, 2026

(54) BRACKET FOR PET CARRIER AND PET CARRIER

(71) Applicant: Shenzhen Guyun Technology Co., Ltd., Shenzhen (CN)

(72) Inventor: Weijun Li, Yiyang City (CN)

( * ) Notice: Subject to any disclaimer, the term of this patent is extended or adjusted under 35 U.S.C. 154(b) by 0 days.

(21) Appl. No.: 19/095,072

(22) Filed: Mar. 31, 2025

(65) Prior Publication Data

US 2026/0293840 A1 Oct. 1, 2026

(51) Int. Cl.
*A01K 1/02* (2006.01)

(52) U.S. Cl.
CPC .................................. *A01K 1/0254* (2013.01)

(58) Field of Classification Search
CPC .. A01K 1/0236; A01K 1/0245; A01K 1/0254; A01K 1/0272; A01K 1/0281
See application file for complete search history.

(56) References Cited

U.S. PATENT DOCUMENTS 5,277,148 A * 1/1994 Rossignol ............ A01K 1/0245 119/497
6,899,057 B1 * 5/2005 Chrisco ................ A01K 1/0254 119/498
2003/0127059 A1 * 7/2003 Smith, Jr. ............ A01K 1/0254 119/496
2010/0126427 A1 * 5/2010 McGrade ............. A01K 1/0254 119/496
2015/0047574 A1 * 2/2015 Jakubowski ......... A01K 1/0254 29/401.1
2023/0165214 A1 * 6/2023 Zheng .................. A01K 1/0254 119/28.5
2024/0298605 A1 * 9/2024 Miranda .............. A01K 1/0245

FOREIGN PATENT DOCUMENTS

BE 899199 A * 7/1984 ........... A01K 1/0245
CN 211129327 U * 7/2020 ............... A01K 1/02

OTHER PUBLICATIONS

English translation (Year: 1984).*
English translation (Year: 2020).*

* cited by examiner

*Primary Examiner* — Peter M Poon
*Assistant Examiner* — Danielle A Clerkley

(57) ABSTRACT

A bracket for a pet carrier, the bracket for a pet carrier is placed inside an outer body of the pet carrier to support the outer body, including a connecting frame and two of supporting frames; the connecting frame is configured to support the outer body. The supporting frames are rotatably connected to two sides of the connecting frame. The supporting frames have a folded state and an unfolded state, when the supporting frames are in the unfolded state, they are configured to support the outer body. When it needs to store the pet carrier, the outer body can be separated from the connecting frame, and then the soft outer body can be folded and the connecting frame can be rotated from the unfolded state to the folded state. The storage process is simple, convenient, and fast.

15 Claims, 20 Drawing Sheets

BRACKET FOR PET CARRIER AND PET CARRIER

TECHNICAL FIELD

The present disclosure relates to the technical field of pet carrier technology, in particular to a bracket for pet carrier and pet carrier.

BACKGROUND

The portable pet carrier has gradually become the mainstream tool for carrying pets outdoors due to its safety and convenience. In related technologies, pet carriers often adopt a combined structure of an outer body and an internal bracket. Typically, the outer body and the internal bracket can be separated for easier storage, and the outer body, made of soft material, can be easily folded. However, the internal bracket is usually made of rigid materials such as hard plastic or metal, which means it needs to be disassembled into multiple parts for storage, making the process of storing the internal bracket inconvenient.

SUMMARY

To solve at least one problem existing in the existing technology mentioned above, the present disclosure provides a bracket.

The bracket for a pet carrier is placed inside an outer body of the pet carrier to support the outer body, including a connecting frame and two of supporting frames; the connecting frame is configured to support the outer body; one of the supporting frames is rotatably connected to one side of the connecting frame, and the other one of the supporting frames is rotatably connected to another side of the connecting frame; the supporting frames have a folded state and an unfolded state, when the supporting frames are in the unfolded state, they are configured to support the outer body.

Setting the bracket inside the outer body, helps to keep the stable of the pet carrier. When it needs to store the pet carrier, the outer body can be separated from the connecting frame, and then the soft outer body can be folded and the connecting frame can be rotated from the unfolded state to the folded state. The storage process is simple, convenient, and fast.

Furthermore, the bracket for the pet carrier further includes a connecting part, the connecting part is configured to connect the supporting frames and the connecting frame.

Furthermore, a top connecting hole is defined on the connecting part, the connecting frame is threaded through the top connecting hole; and a side connecting hole is also defined on the connecting part, in which at least part of each of the supporting frames is located.

Furthermore, the upper side of the connecting part is penetrated by the top connecting hole, making the connecting part detachably connect with the connecting frame.

Furthermore, the bracket for the pet carrier further includes a fixing part;

wherein the fixing part is slidably connected to the connecting frame; and the fixing part is provided with a first slot and a second slot; and when the supporting frames are in the unfolded state, the fixing part slides toward the connecting part, making the first slot engage with the connecting part to restrict the rotation of the supporting frames; and when the first slot is separated from the connecting part, positions of the supporting frames are no longer restricted; and when the supporting frames are in the folded state, the fixing part slides toward the connecting part, making the second slot engage with the connecting part to restrict the rotation of the supporting frames; and when the second slot is separated from the connecting part, the positions of the supporting frames are no longer restricted.

Furthermore, the a length of the bracket for the pet carrier is adjusted according to at least one direction along its length, width, or height.

Furthermore, the connecting frame comprises two first link rods and two second link rods;

wherein two of the first link rods are arranged in parallel; and two of the second link rods are arranged in parallel, with one ends of the second link rods connected to one of the first link rods, and the other ends connected to another of the first link rods;

wherein the second link rods are connected to the supporting frames.

Furthermore, the second link rod includes a first section, a second section, and an elastic limiting member;

wherein the first section is slidably connected to the second section, the second section is sleeved around the first section, and the elastic limiting member is disposed inside the first section and at least partially extends from the first section to resist the second section, thereby limiting a relative position of the first section and the second section.

Furthermore, the second link rod includes:

a middle section, two ends of which are provided with threaded portions;

two of side sections, wherein one of the side sections is threadedly connected to one of the threaded portions of the middle section, and the other one of the side sections is threadedly connected to the other one of the threaded portions of the middle section, to adjust a length of the second link rod.

Furthermore, the bracket for the pet carrier further includes a limiting block;

wherein the limiting block is connected to one of the supporting frames; and when the supporting frames are in the unfolded state, the limiting block is configured to connect to the outer body; and when the supporting frames are in the folded state, the limiting block is connected to the connecting frame.

Furthermore, the connecting frame includes a third link rod, when the supporting frames are in the folded state, the limiting block is connected to the third link rod.

Furthermore, the limiting block is provided with a limiting groove, which is configured to cooperate with the outer body or the connecting frame; and the limiting block is rotatably connected to one of the supporting frames, making the limiting groove face to the outer body or the connecting frame.

Furthermore, one side of the limiting block is provided with a first positioning block, when the limiting groove cooperates with the outer body, the first positioning block also cooperates with the outer body to limit the rotation of the limiting block.

Furthermore, each of the supporting frames is provided with a second positioning block, when the supporting frames are in the unfolded state, and the limiting groove faces the outer body, the second positioning block is attached to the first positioning block, and both the first positioning block and the second positioning block cooperate with the outer body.

The present disclosure further provides a pet carrier, including an outer body, wherein the pet carrier further includes the bracket for the pet carrier, which is detachably installed inside the outer body.

Furthermore, an inner part of the outer body is provided with a buckle, which is detachably connected to one of the supporting frames.

Furthermore, the buckle is provided with a connecting groove, the connecting groove is connected to one of the supporting frames.

Furthermore, the buckle includes a connecting part and a pull tab, the connecting groove is set in the connecting part and the pull tab is positioned on one side of the connecting groove.

Furthermore, the bracket for the pet carrier includes a limiting block, the limiting block is provided on one of the supporting frames;

when the supporting frames are in the unfolded state, the limiting block is connected to the buckle, and one of the supporting frames is detachably connected to the buckle via the limiting block.

Furthermore, the buckle includes a connecting block and a stucking rod;

wherein the connecting block is connected to an inner part of the outer body; and an accommodating slot is defined on the connecting block, and the stucking rod is accommodated in the accommodating slot, with the limiting block cooperating with the stucking rod.

The present disclosure provides the bracket for the pet carrier, and a pet carrier with the bracket. Its beneficial effect lies in the rotating connection between the supporting frames and the connecting frame, so that the brackets can be folded to facilitate the storage of the pet carrier. In addition, by setting the limiting block to cooperate with the outer body and connecting frame, the supporting frames can be kept stable when they are in the unfolded state and folded state.

DESCRIPTION OF THE REFERENCE NUMERAL

100 pet carrier; and

Figure 1:
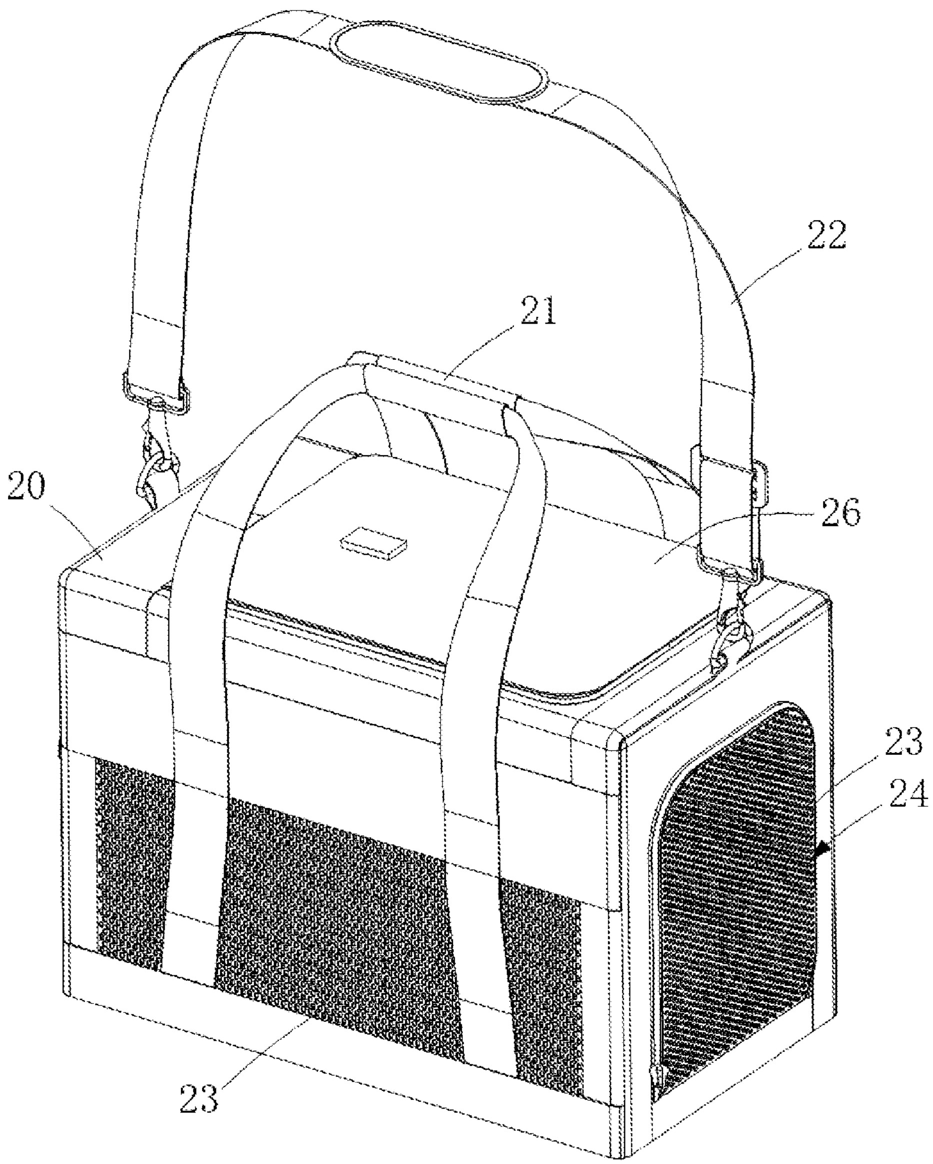
FIG. 1 is a perspective view of a pet carrier according to an embodiment of the present disclosure.

10 bracket, 11 connecting frame, 111 first link rod, 112, second link rod, 1121 middle section, 11211 threaded portion, 1122 side section, 112*a* first section, 112*b* second section, 112*c* elastic limiting member, 112*d* first hole, 112*e* second hole, 1121*c* elastic member, 1122*c* locating block, 113 third link rod, 12 supporting frame, 121 vertical rod, 122 horizontal rod, 1221 second positioning block, 13 connecting part, 131 top connecting hole, 132 side connecting hole, 14 fixing part, 141 first slot, 142 second slot, 15 limiting block, 151 limiting groove, 152 first positioning block; and

20 outer body, 21 handle strap, 22 shoulder strap, 23 mesh structure, 24 first opening, 25 second opening, 26 sunshade cloth, 27 upper opening; 28 buckle; 281*a* connecting block, 2811*a* accommodating slot, 2812*a* positioning slot; 282*a* stucking rod; 281*b* connecting part; 2811*b* connecting groove, 282*b* pull tab, 29 connecting strap; 210 hard board.

DETAILED DESCRIPTION OF THE EMBODIMENTS

To help those skilled in the art better understand the technical solutions of the present disclosure, the following detailed description of the disclosure is made in conjunction with the accompanying drawings. The description in this section is merely exemplary and explanatory, and should not be construed as limiting the protection scope.

It should be noted that similar reference numbers and letters in the following drawings represent similar items. Therefore, once an item is defined in one drawing, there is no need for further definition or explanation in the subsequent drawings.

It is important to clarify that terms such as “center,” “up,” “down,” “left,” “right,” “vertical,” “horizontal,” “inside,” “outside,” and others, indicating orientation or positional relationships, refer to the orientation or position relationship based on the figures provided or the usual placement of the disclosure’s product during use. These terms are used solely for the purpose of describing the disclosure and simplifying the description, not to indicate or imply that the device or component must have a specific orientation or must be constructed and operated in a particular orientation. Therefore, these terms should not be understood as limiting the disclosure. In addition, terms such as "first," "second," "third," etc., are used solely for distinguishing purposes and should not be interpreted as indicating or implying relative importance.

Furthermore, terms such as "horizontal," "vertical," and "suspended" do not imply that the components must be absolutely horizontal or suspended, but may be slightly tilted. For example, "horizontal" merely refers to the direction being relatively more horizontal than "vertical" and does not mean that the structure must be perfectly horizontal; it can be slightly inclined.

Unless otherwise defined, all technical and scientific terms used herein have the meaning commonly understood by those skilled in the art of the technical field of the disclosure. The terminology used in this description of the disclosure is for the purpose of describing specific embodiments and is not intended to limit the disclosure.

The portable pet carrier has gradually become the mainstream tool for carrying pets outdoors due to its safety and convenience. In related technologies, pet carriers often adopt a combined structure of an outer body and an internal bracket. Typically, the outer body and the internal bracket can be separated for easier storage, and the outer body, made of soft material, can be easily folded. However, the internal bracket is usually made of rigid materials such as hard plastic or metal, which means it needs to be disassembled into multiple parts for storage, making the process of storing the internal bracket inconvenient.

To address the technical problem of inconvenient supporting frame storage in the prior art, the present disclosure provides a bracket for the pet carrier.

Figures 1, 2:
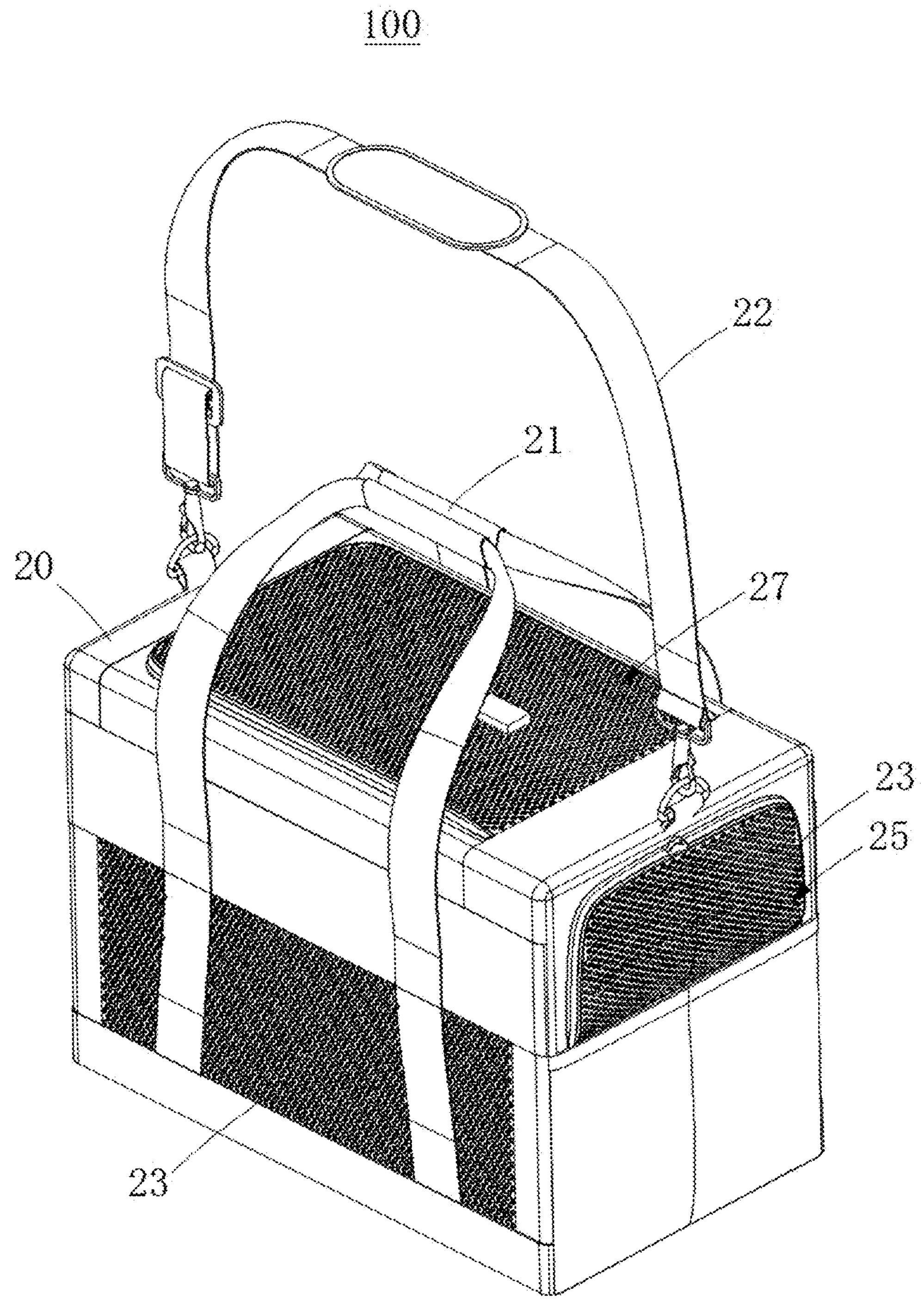
FIG. 2 is a perspective view of the pet carrier according to another embodiment of the present disclosure.

Please refers to FIGS. 1-2, the bracket 10 is placed inside an outer body 20 of the pet carrier to support the outer body 20, including a connecting frame and two of supporting frames. The connecting frame 11 is configured to support an inner top surface or an inner bottom surface of the outer body 20. One of the supporting frames 12 is rotatably connected to one side of the connecting frame 11, and the other one of the supporting frames 12 is rotatably connected to another side of the connecting frame 11. The supporting frames 12 have a folded state and an unfolded state, when the supporting frames 12 are in the unfolded state, they are configured to support the inner top surface or the inner bottom surface the outer body 20.

For the bracket 10 for the pet carrier 100, the bracket is set inside the outer body 20, ensuring the stability of a shape of the outer body 20. When the pet carrier 200 needs to be stored, the outer body 20 can be separated from the bracket easily. Then, the soft outer body 20 can be folded, and the supporting frames 12 can be rotated from the unfolded state to the storage state, thus completing the storage of the pet carrier. This storage process is simple, convenient, and fast.

The following is a further detailed description of the present disclosure, in conjunction with the accompanying drawings.

Figure 3:
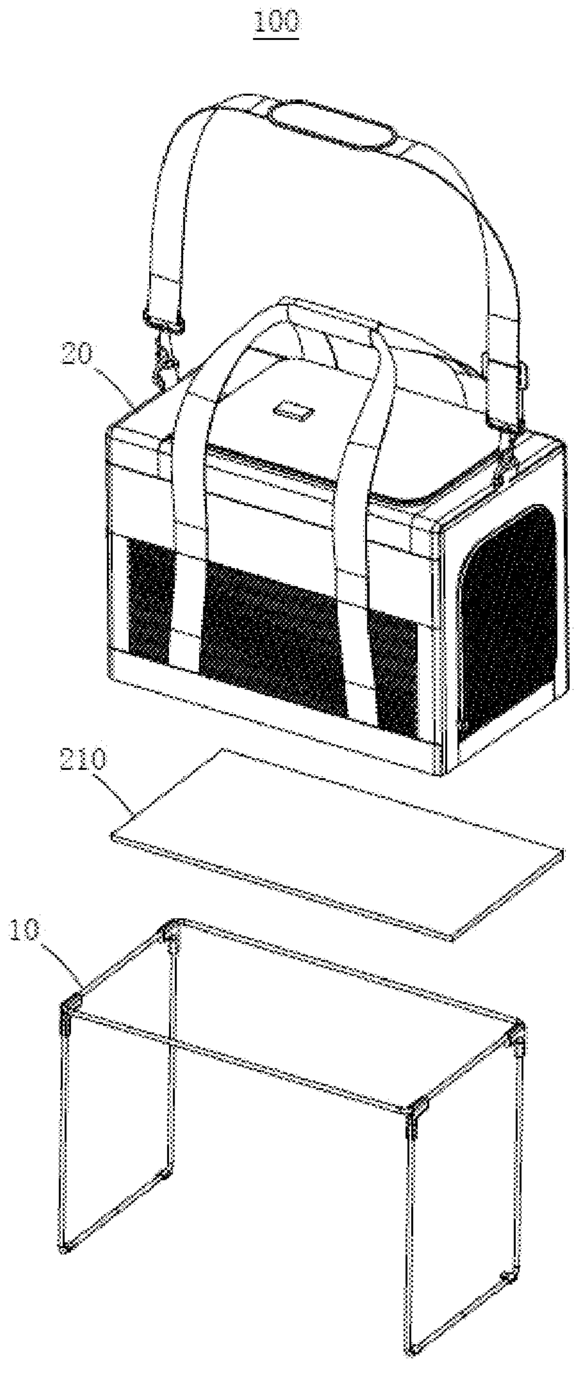
FIG. 3 is an exploded diagram of the pet carrier in FIG. 1.

The embodiment of the present disclosure discloses a bracket 10 and a pet carrier 100 with the bracket 10. Please refer to FIGS. 1 to 3. FIG. 1 is a perspective view of the pet carrier. FIG. 2 is a perspective view of the pet carrier according to another embodiment of the present disclosure. FIG. 3 is an exploded view of the pet carrier in FIG. 1.

Users can place their pets in the pet carrier 100 for easy transport. Pets include, but are not limited to, cats, dogs, hamsters, etc.

The pet carrier 100 also includes an outer body 20, and the bracket 10 is placed inside the outer body 20 to support it, ensuring that the shape of the outer body 20 remains stable.

Optionally, the bracket 10 is detachably connected to the outer body 20. This means that when the pet carrier 100 needs to carry pets, the bracket 10 can be installed inside the outer body 20. When the pet carrier 100 needs to be stored, the outer body 20 can be separated from the bracket 10 and stored separately.

Optionally, the material of the outer body 20 is a soft material, such as a combination of one or more materials like canvas, oxford cloth, nylon fabric, leather, etc. It should be noted that the material of the outer body 20 is not limited to being entirely soft; it can also have parts made from soft materials and other parts made from rigid materials.

In some embodiments, the outer body 20 is equipped with a handle strap 21 and a shoulder strap 22, allowing the user to either carry the pet carrier 100 by hand or wear it cross-body.

In some embodiments, the opposite sides of the outer body 20 are made of a mesh structure 23 with multiple mesh holes. These mesh holes may be consistent in size or vary in size, and they may be arranged in a regular or irregular pattern.

In some embodiments, one end of the outer body 20 is equipped with a first opening 24. This first opening 24 allows the pet to enter the outer body 20. A zipper is provided at the first opening 24, allowing the user to open, close, or leave the first opening 24 in a partially open or partially closed state.

In some embodiments, the other end of the outer body 20 is equipped with a second opening 25, which allows the pet's head, located inside the outer body 20, to extend out of the outer body 20. The size of the second opening 25 is smaller than that of the first opening 24, and a bottom of the second opening 25 is positioned above a bottom of the first opening 24.

In some embodiments, both structure of the first opening 24 and the second opening 25 are the mesh structure 23, which not only allows air circulation between the interior of the outer body 20 and the outside world but also enables the pet to observe the situation outside the pet carrier In some embodiments, a top structure of the outer body 20 the mesh structure 23.

In some embodiments, the top of the outer body 20 is equipped with a sunshade cloth 26, which can cover the mesh structure 23 to block rainwater from entering the outer body 20 or prevent direct sunlight from shining into the outer body 20.

By rotating or folding the sunshade cloth 26, the area of the mesh structure 23 on the top of the outer body 20 that is covered by the sunshade cloth 26 can be adjusted, allowing the user to make corresponding adjustments.

In some embodiments, the top surface of the outer body 20 is defined with an upper opening 27, and the position of the upper opening 27 corresponds to the mesh structure 23. A size of the upper opening 27 is controlled by a zipper, which can open or close the upper opening 27 or keep it in a partially open or closed state. The upper opening 27 is used to install or remove the bracket 10 for the pet carrier 100.

Figure 4:
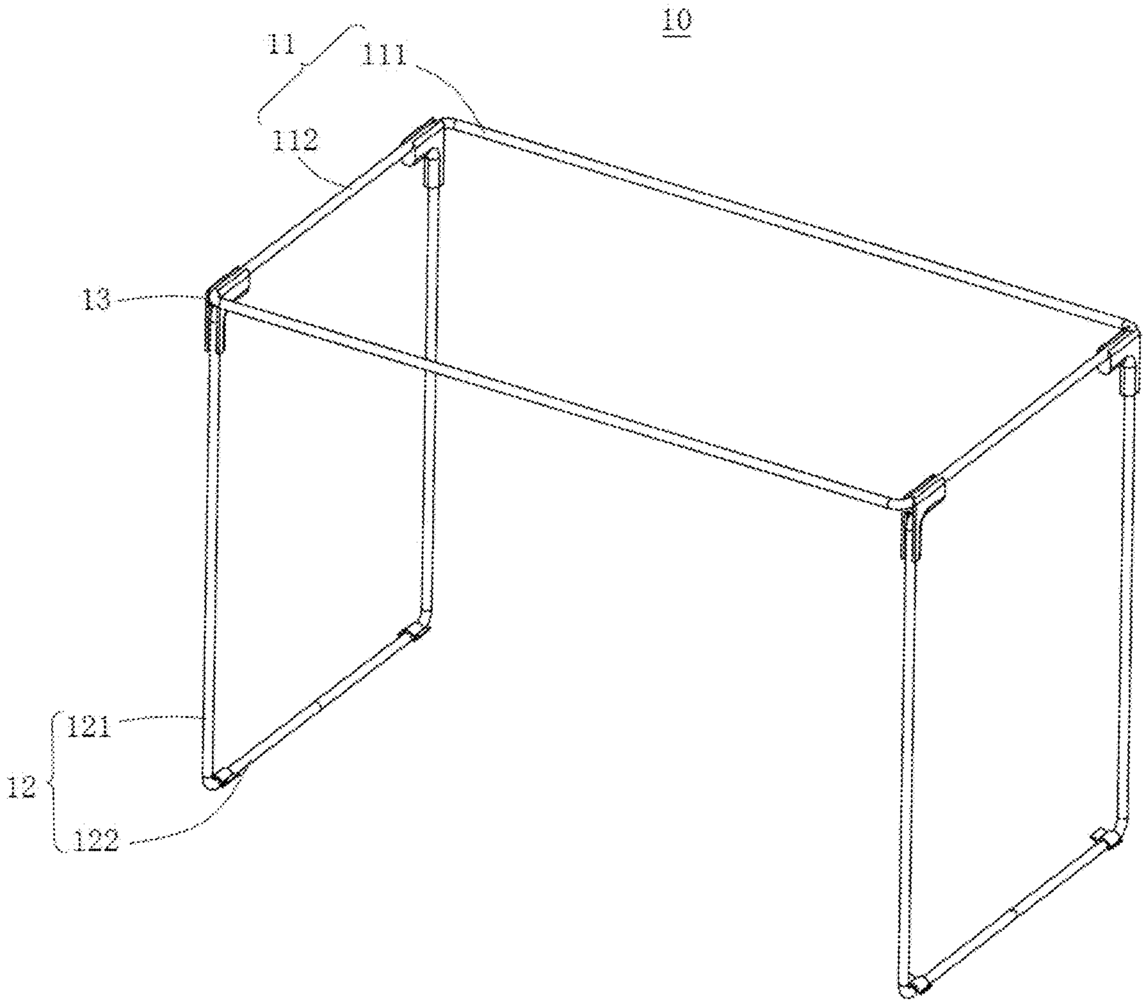
FIG. 4 is a perspective view of a bracket for the pet carrier according to an embodiment of the present disclosure.
Figure 5:
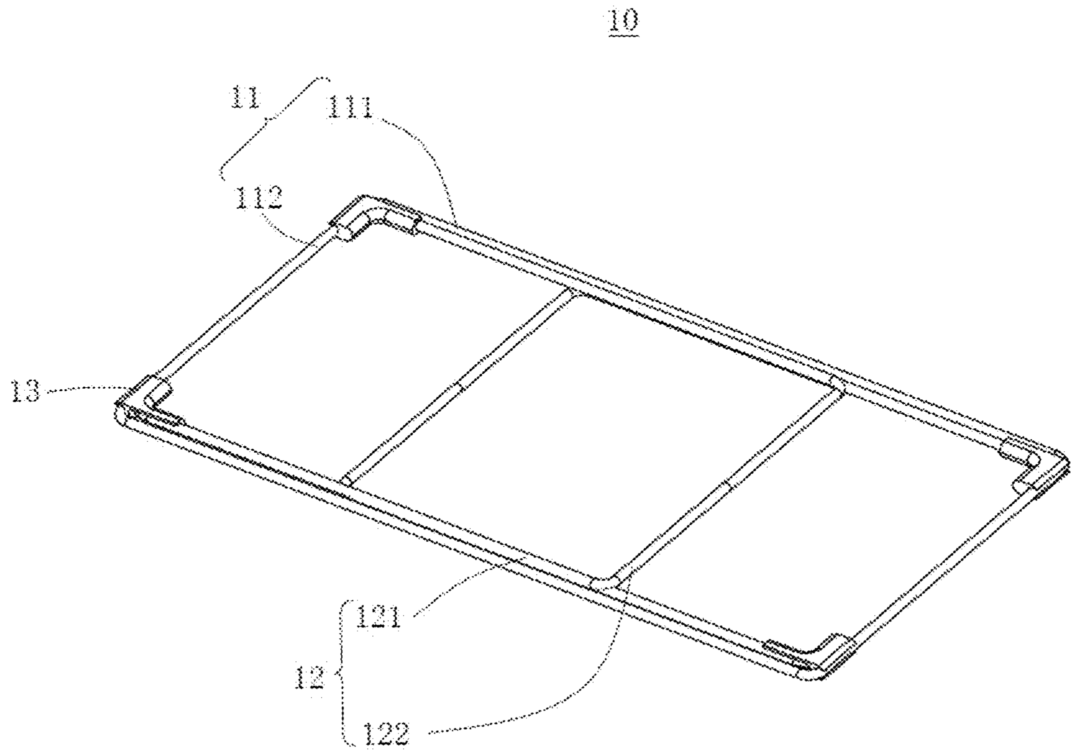
FIG. 5 is a perspective view of the bracket for the pet carrier in FIG. 4 shown in a folded state.
Figure 6:
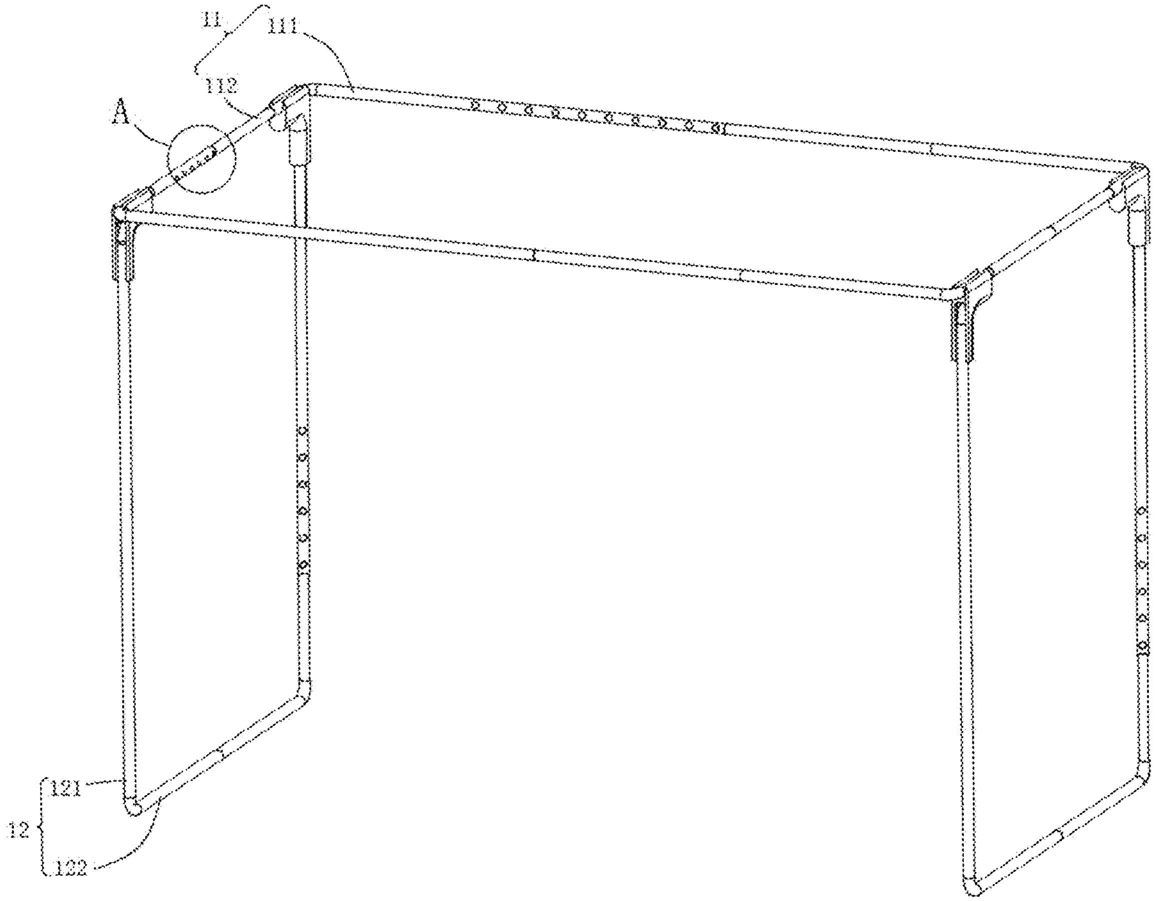
FIG. 6 is a perspective view of the bracket for the pet carrier according to another embodiment of the present disclosure.
Figure 7:
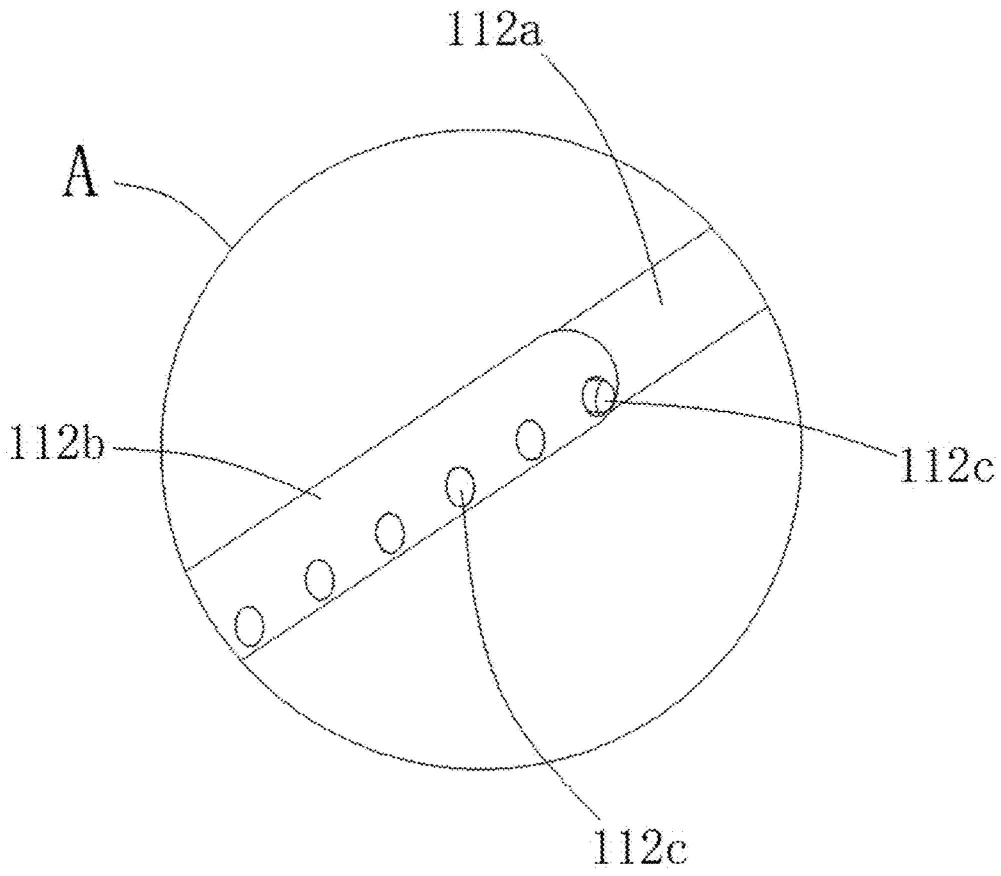
FIG. 7 is an enlarged view of area B in FIG. 6.
Figure 8:
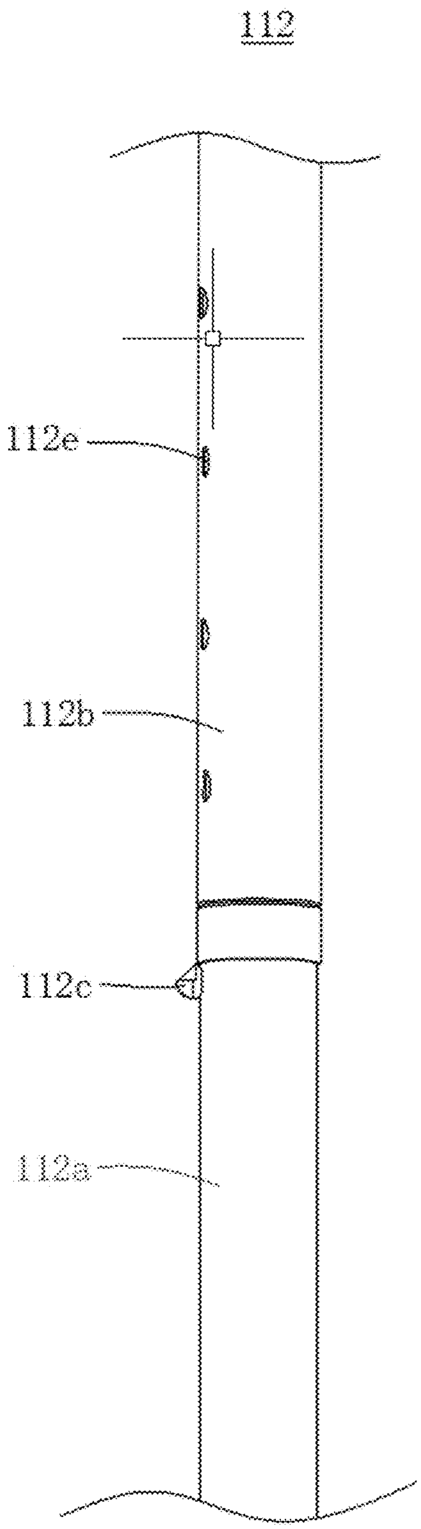
FIG. 8 is an schematic structural diagram of a part of a second link rod in FIG. 1.
Figure 9:
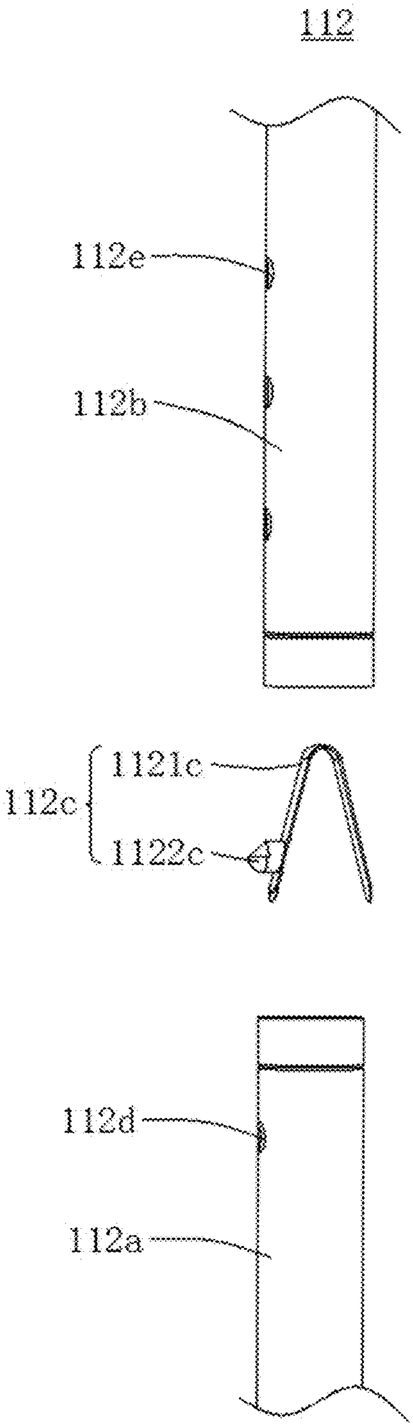
FIG. 9 is an exploded diagram of the part of the second link rod in FIG. 1.

Please refer to FIGS. 3, 4, and 5, where FIG. 3 is an exploded diagram of the pet carrier 100 in FIG. 1, FIG. 4 is a perspective view of a bracket 10 for the pet carrier 100 according to an embodiment of the present disclosure, and FIG. 5 is a perspective view of the bracket 10 for the pet carrier 100 in FIG. 4 shown in a folded state.

The bracket 10 includes a connecting frame 11 and two supporting frames 12. The connecting frame 11 is configured to support the inner top surface or inner bottom surface of the outer body 20, and when the connecting frame 11 supports the inner top surface of the outer body 20, a hard board 210 can be provided on the inner bottom surface of the outer body 20 to keep the pet carrier 100 stable. Similarly, when the connecting frame 11 supports the inner bottom surface of the outer body 20, a hard board 210 can also be provided on the inner top surface of the outer body 20. One supporting frames 12 is rotatably connected to one side of the connecting frame 11, and the other supporting frames 12 is rotatably connected to the other side of the connecting frame 11, allowing the two supporting frames 12 to have both a folded state and an unfolded state. When the supporting frames 12 are in the unfolded state, the bracket 10 forms an inverted U-shape, with the supporting frames 12 used to support the inner side of the outer body 20. When the supporting frames 12 are in the folded state, the connecting frame 11 and the supporting frames 12 lie approximately in a same plane.

By placing the bracket 10 inside the outer body 20, the shape of the outer body 20 is kept stable. When the pet carrier 100 needs to be stored, the outer body 20 can be separated from the pet carrier bracket 10. Then, the soft outer body 20 can be folded, and the supporting frames 12 can be rotated from the unfolded state to the storage state, thus completing the storage of the pet carrier 100. This storage process is simple, convenient, and fast.

In some embodiments, the pet carrier bracket 10 is configured to allow adjustment of its length in at least one direction along its length, width, or height. Since the outer body 20 is made of flexible material, it can contract to some extent. Therefore, the pet carrier bracket 10 can adjust its length in at least one direction, thereby adjusting the size of the bracket 10 and making it suitable for different environments.

It should be noted that the direction in which the pet carrier bracket 10 can be adjusted is not limited. It can be adjusted in only one direction, or in two or three directions. When adjustment is possible in only one direction, it can be in the length, width, or height direction.

Please further refer to FIG. 4, in some embodiments, the connecting frame 11 includes two first link rods 111 and two second link rods 112.

The two first link rods 111 are arranged parallel to each other, and the two second link rods 112 are arranged parallel to each other. One end of the second link rod 112 is connected to one of the first link rods 111, and the other end is connected to the other first link rod 111. The first link rods 111 and the second link rods 112 form an angle of approximately 90° with each other, giving the connecting frame 11 a rectangular shape. The second link rods 112 are connected to the supporting frames 12.

Optionally, the length of each of the first link rod 111 is greater than the length of each second link rod 112, that is, the length of the first link rod 111 corresponds to the length of the connecting frame 11, while the length of each second link rod 112 corresponds to the width of the connecting frame 11.

In some embodiments, a length of the second link rod 112 can be adjusted, that is, the width of the bracket 10 can be adjusted. It should be noted that, since the supporting frames 12 are connected to the connecting frame 11, the supporting frames 12 are also configured to be adjustable in the width direction. The adjustment method for the supporting frames 12 can be the same as that of the second link rods 112, or it can be different.

Please refer to FIGS. 6 to 9, in some embodiments, each of the second link rod 112 includes a first section 112*a*, a second section 112*b*, and an elastic limiting member 112*c*. The first section 112*a* is slidingly connected to the second section 112*b*, and the diameter of the first section 112*a* is smaller than that of the second section 112*b*, allowing the second section 112*b* to be sleeve-fitted over the first section 112*a*. The elastic limiting member 112*c* is located within the first section 112*a* and extends at least partially out of the first section 112*a*, abutting against the second section 112*b* to limit the relative position between the first section 112*a* and the second section 112*b*. The elastic limiting member 112*c* can also be positioned inside the first section 112*a* to allow the first section 112*a* to retract into the second section 112*b*.

Optionally, the first section 112*a* is defined with a first hole 112*d*, and the second section 112*b* is provided with several second holes 112*e*. The elastic limiting part 112*c* is at least partially inserted through the first hole 112*d* and one of the second holes 112*e* to limit the position of the first section 112*a* relative to the second section 112*b*.

In some embodiments, the elastic limiting part 112*c* includes an elastic member 1121*c* and a locating block 1122*c*. The elastic member 1121*c* is located inside the first section 112*a*, and the locating block 1122*c* is connected to the elastic member 1121*c* and can extend out of the first section 112*a* through the first hole 112*d* or retract back into the first section 112*a*.

Figure 10:
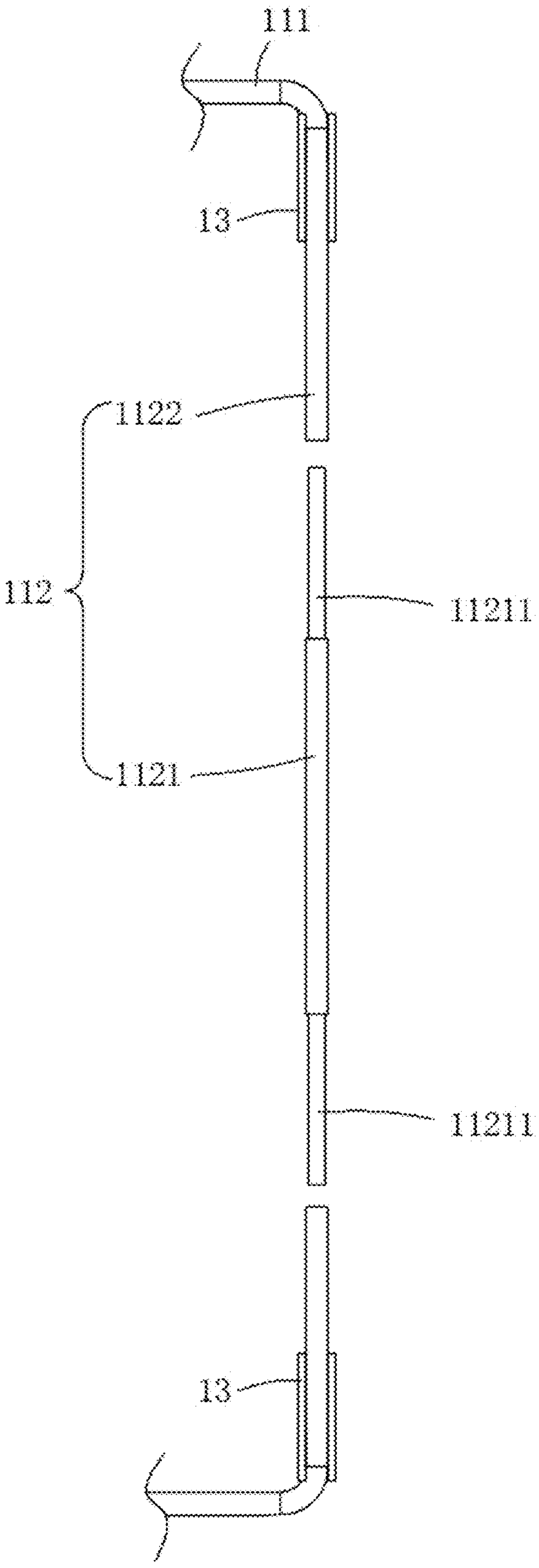
FIG. 10 is a top view of a first link rod and the second link rod.

Please refer to FIG. 10, in some embodiments, each of the second link rod 112 includes a middle section 1121 and two side sections 1122. Both ends of the middle section 1121 are formed with threaded portions 11211. One of the side sections 1122 is threadedly connected to one of the threaded portions 11211 of the middle section 1121, and the other side section 1122 is threadedly connected to the other threaded part 11211 of the middle section 1121 to adjust the length of the second link rods 112.

Specifically, the side sections 1122 can be hollow structures and are provided with threaded holes that fit the threaded parts 11211, allowing the overall length of the second link rods 112 to be adjusted by rotating the middle section 1121, thereby adjusting the width of the bracket 10.

Due to the flexible structure of the outer body 20, when the width of the bracket 10 is reduced, the outer body 20 can also correspondingly shrink in size, making it easier to place the pet carrier 100 in environments with limited space. For example, when the pet carrier 100, containing a pet, needs to be placed in the trunk of a car, the trunk may have limited space due to the presence of many other items. In this case, the width of the bracket 10 can be adjusted by the middle section 1121 so that the pet carrier 100 can fit in the trunk.

It should be noted that the threaded part 11211 is not limited to protruding threaded columns. In some other embodiments, the threaded part 11211 can also be a recessed threaded hole, and at this time, the side section 1122 is provided with protruding threaded columns.

In some embodiments, the threaded part 11211 is a protruding threaded column, and the directions of the two protruding threaded columns are opposite, so that when the protruding threaded columns are rotated in one direction, the two side sections 1122 can either move closer to each other or further apart, facilitating the adjustment of the width of the connecting frame 11.

In some embodiments, other directions of the bracket 10 can also have adjustable lengths, and the structure for adjusting length can be similar to that of the second link rods 112.

Please further refer to FIG. 4, in some embodiments, the supporting frames 12 includes two vertical rods 121 and a horizontal rod 122 connecting the two vertical rods 121. The two vertical rods 121 are spaced and arranged vertically, and the horizontal rod 122 is located between the two vertical rods. One end of the horizontal rod 122 is connected to the lower end of one of the vertical rods 121, and the other end is connected to the lower end of the other vertical rod 121, forming a U-shape for the supporting frames 12.

Figure 11:
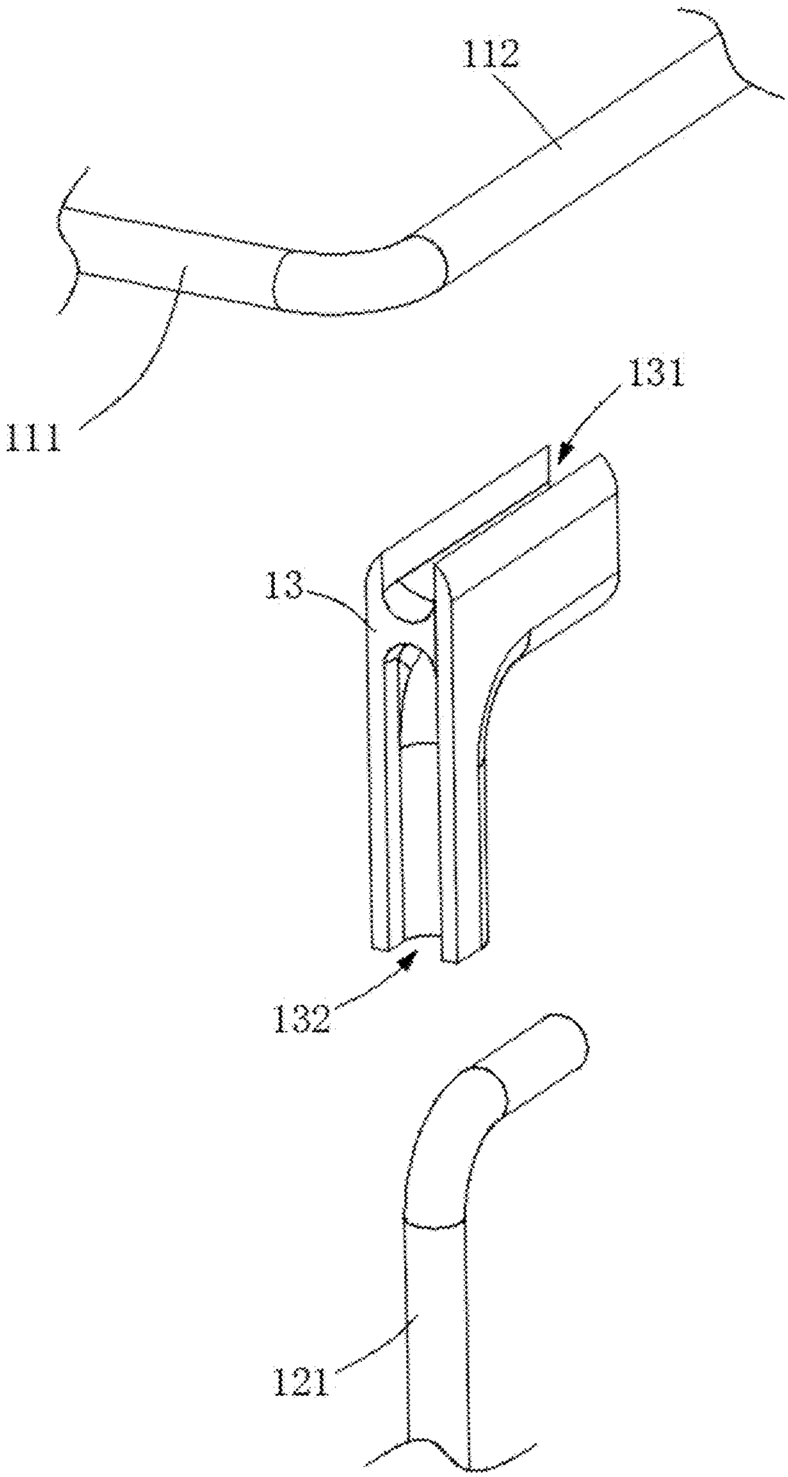
FIG. 11 is an exploded diagram of part of the first link rod, the second link rod and connecting part and a vertical rod.

Please refer to FIG. 4 or FIG. 11, in some embodiments, the bracket 10 further includes a connecting part 13, with the supporting frames 12 rotatably connected to the connecting frame 11 via the connecting part 13. Specifically, the connecting part 13 is connected to the vertical rod 121 of the supporting frames 12 and to the second link rods 112 of the connecting frame 11. The connecting part 13 may be made of plastic material and can either be fixedly connected to the vertical rod 121 or the second link rod 112, or it may be detachably connected.

In some embodiments, the connecting part 13 is fixedly connected to the vertical rod 121 and detachably connected to the second link rod 112. In some embodiments, the connecting part 13 is provided with a top connecting hole 131, through which the second link rod 112 of the connecting frame 11 passes. The connecting part 13 is also provided with a side connection hole 132, where the vertical rod 121 of the each of the supporting frames 12 is located in the side connection hole 132.

In some embodiments, the top connecting hole 131 passes through the upper side of the connecting part 13, allowing the connecting part 13 to be detachably connected to the second link rod 112 of the connecting frame 11. The detachable connection between the connecting part 13 and the second link rod 112 allows for the replacement of either the connecting frame 11 or the supporting frames 12 in case of damage, without needing to replace the entire bracket 10, which helps save on maintenance costs.

Figure 12:
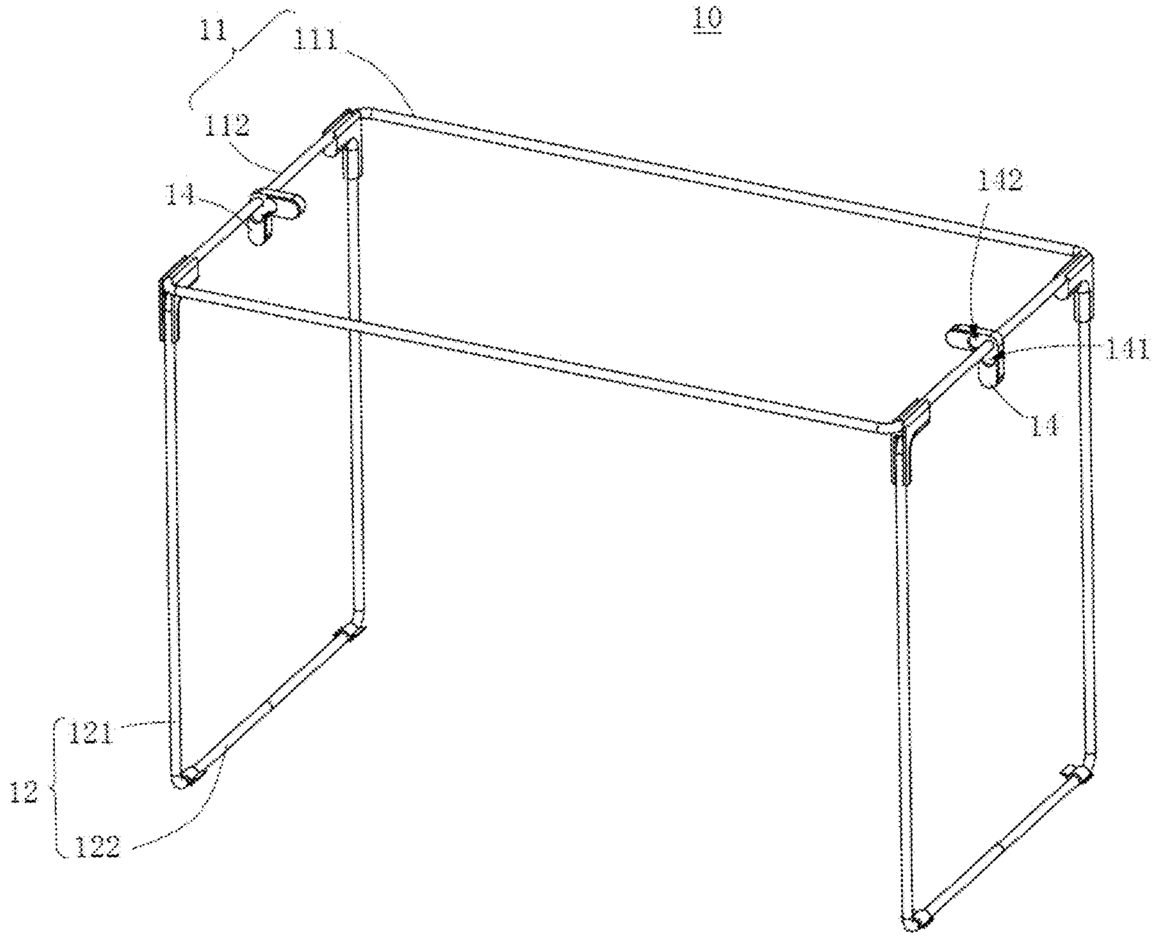
FIG. 12 is a perspective view of the bracket for the pet carrier according to another embodiment in the present disclosure.

Please refer to FIG. 12, FIG. 12 shows a perspective view of another embodiment of the bracket of the pet carrier.

The bracket 10 also includes a fixing part 14, which works with the connecting part 13 to limit the rotation of the supporting frames 12, allowing the supporting frames 12 to remain in either the unfolded state or folded state. Specifically, the fixing part 14 is slidably connected to the connecting frame 11 and is provided with a first slot 141 and a second slot 142. When the supporting frames 12 are in the unfolded state, the fixing part 14 can slide toward the connecting part 13 so that the first slot 141 engages the connecting part 13, limiting the rotation of the supporting frames 12. When the first slot 141 separates from the connecting part 13, the position limitation of the supporting frames 12 are released.

When the supporting frames 12 is in the folded state, the fixing part 14 can slide toward the connecting part 13 so that the second slot 142 engages the connecting part 13, limiting the rotation of the supporting frames 12. When the second slot 142 separates from the connecting part 13, the position limitation of the supporting frames 12 is released.

The cooperation of the fixing part 14 and the connecting part 13 helps maintain the stability of the position of the supporting frames 12, thereby improving the stability and durability of the bracket 10. Optionally, the angle between the first slot 141 and the second slot 142 is approximately 90°.

Optionally, the fixing part 14 can slide along the second link rod 112 of the connecting frame 11. The fixing part 14 is configured to slide relative to the second link rod 112 only along the length direction of the second link rod 112 without rotating relative to the second link rod 112. Specifically, the cross-section of the second link rod 112 can be polygonal, such as square, to ensure that the fixing part 14 slides without rotating relative to the second link rod 112.

It should be noted that the cross-section of the second link rod 112 could also be circular, in which case, under stronger force, the fixing part 14 and the second link rod 112 could rotate relative to each other. However, in normal daily use, due to the friction between the fixing part 14 and the second link rod 112, no rotation occurs between the fixing part 14 and the second link rod 112.

Figure 13:
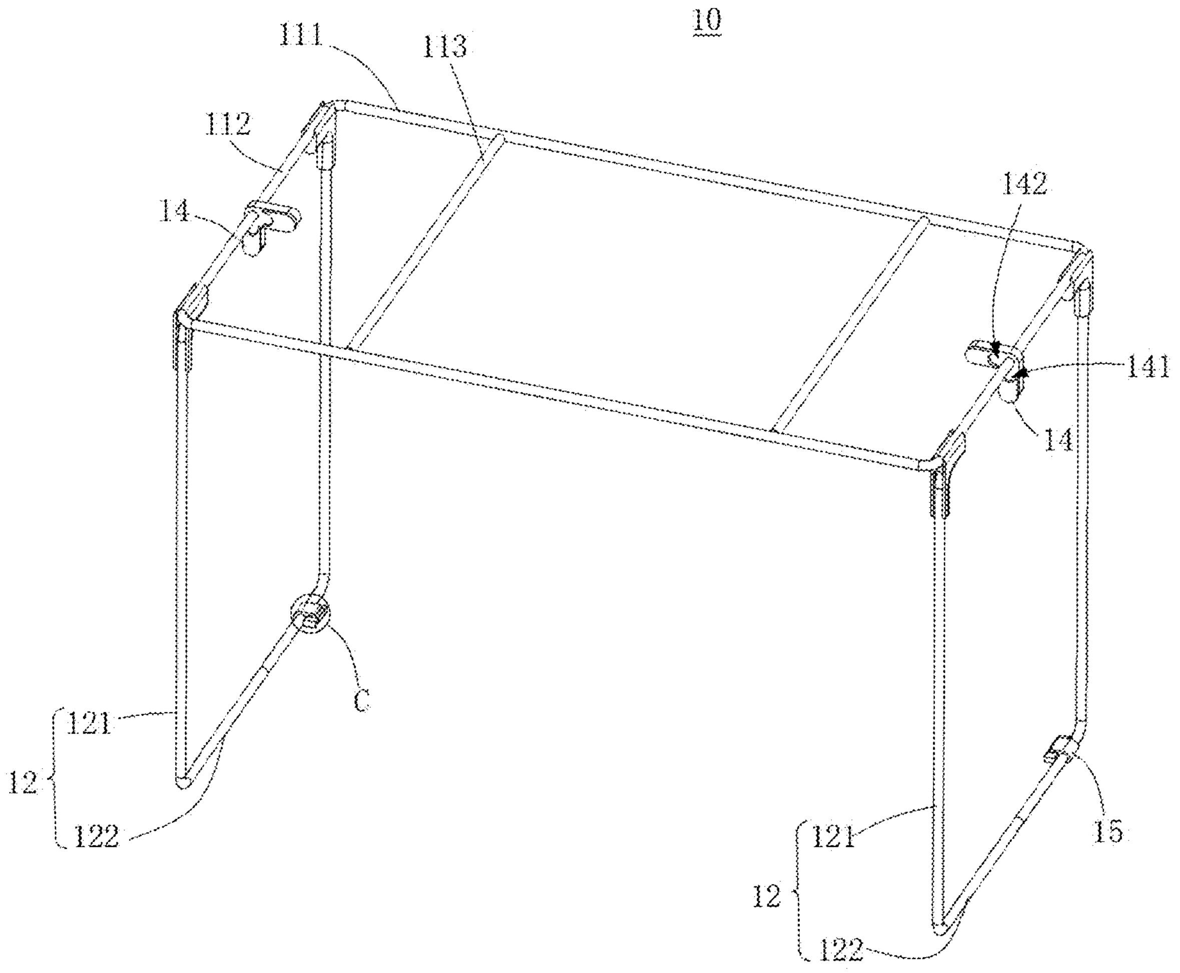
FIG. 13 is a perspective view of the bracket for the pet carrier according to another embodiment in the present disclosure.
Figure 14:
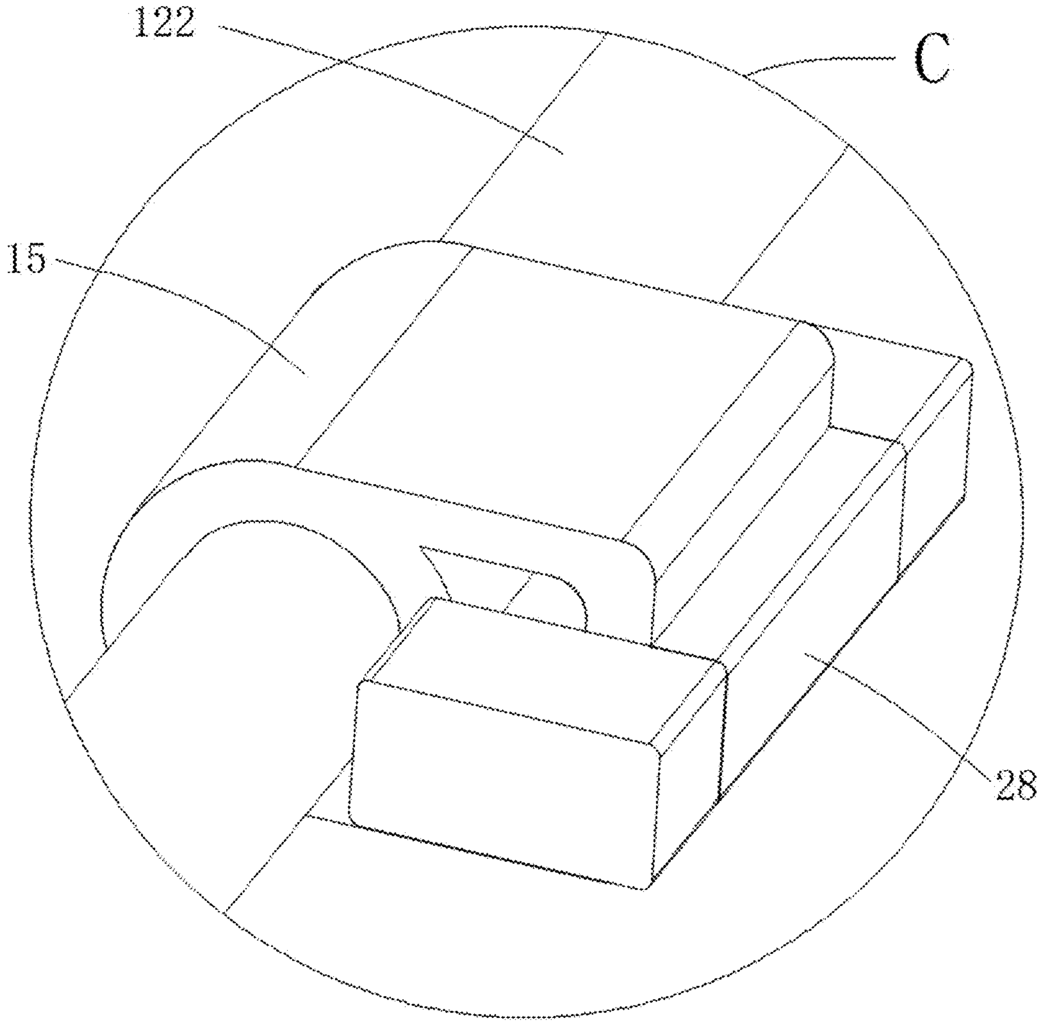
FIG. 14 is an enlarged view of area C in FIG. 13.
Figure 15:
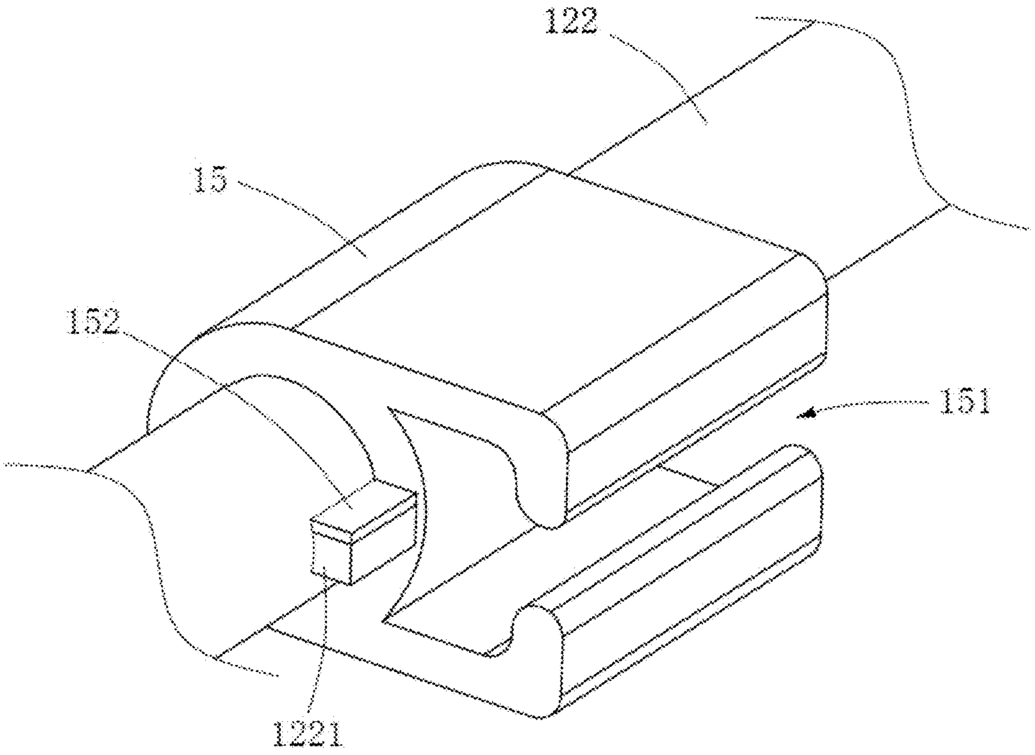
FIG. 15 is a perspective view of of the limiting block and a part of a horizontal rod.

Please refer to FIGS. 13 to 15, FIG. 13 is a perspective view of the bracket for the pet carrier according to another embodiment in the present disclosure. FIG. 14 is an enlarged view of area C in FIG. 13. FIG. 15 is a perspective view of of the limiting block and a part of a horizontal rod.

The bracket 10 also includes a limiting block 15, which is connected to the supporting frames 12. When the supporting frames 12 is in the unfolded state, the limiting block 15 is used to connect with the outer body 20. When the supporting frames 12 are in the folded state, the limiting block 15 connects with the connecting frame 11. Specifically, the limiting block 15 is connected to the horizontal rod 122 of the supporting frames 12.

The limiting block 15 can be connected either to the outer body 20 or the connecting frame 11, further enhancing the positional stability of the supporting frames 12.

In some embodiments, the length of the vertical rod 121 is approximately the same as the length of the first link rod 111, meaning the height and length of the pet crate 100 are roughly the same. When the supporting frames 12 is in the folded state, the limiting block 15 connects with the second link rod 112.

Please refer to FIG. 13, in some embodiments, the length of the vertical rod 121 is shorter than the length of the first link rod 111. The connecting frame 11 includes a third link rod 113, and when the supporting frames 12 is in the folded state, the limiting block 15 connects with the third link rod 113.

Specifically, there are two third link rods 113, located between the two second links 112, with both ends connected to the corresponding first link rod 111. The third link rod 113 is parallel to the second link rod 112. When the supporting frames 12 are in the folded position, the position of the limiting block 15 corresponds to the third link rod 113, so that the limiting block 15 can connect with the third link rod 113.

Please refer to FIGS. 14 and 15, in some embodiments, the limiting block 15 is provided with a limiting groove 151, which works with the outer body 20 or the connecting frame 11. The limiting block 15 is rotatably connected to the supporting frames 12, so that the limiting groove 151 can face the outer body 20 or the connecting frame 11.

Where the limiting groove 151 faces the outer body 20, it can be understood that the limiting groove 151 faces the side that can cooperate with the limiting block 15. The arrangement of the limiting block 15 enables it to rotate relative to the horizontal rod 122, ensuring that the limiting groove 151 aligns with the corresponding position, making it easier for the limiting block 15 to connect with the corresponding structure.

In some embodiments, one side of the limiting block 15 is provided with a first positioning block 152. When the limiting groove 151 is engaged with the outer body 20, the first positioning block 152 also engages with the outer body 20 to limit the rotation of the limiting block 15.

By providing the first positioning block 152, the connection stability between the limiting block 15 and the outer body 20 is enhanced, reducing the possibility of relative rotation between the supporting frames 12 and the outer body 20.

In some embodiments, the horizontal rod 122 of the supporting frames 12 is provided with a second positioning block 1221. When the supporting frames 12 are in the unfolded state, and the limiting groove 151 faces the outer body 20, the second positioning block 1221 fits with the first positioning block 152, and both the first positioning block 152 and the second positioning block 1221 engage with the outer body 20.

When both the first positioning block 152 and the second positioning block 1221 engage with the outer body 20, the relative position between the limiting block 15 and the horizontal rod 122 is fixed, enhancing stability.

Figure 16:
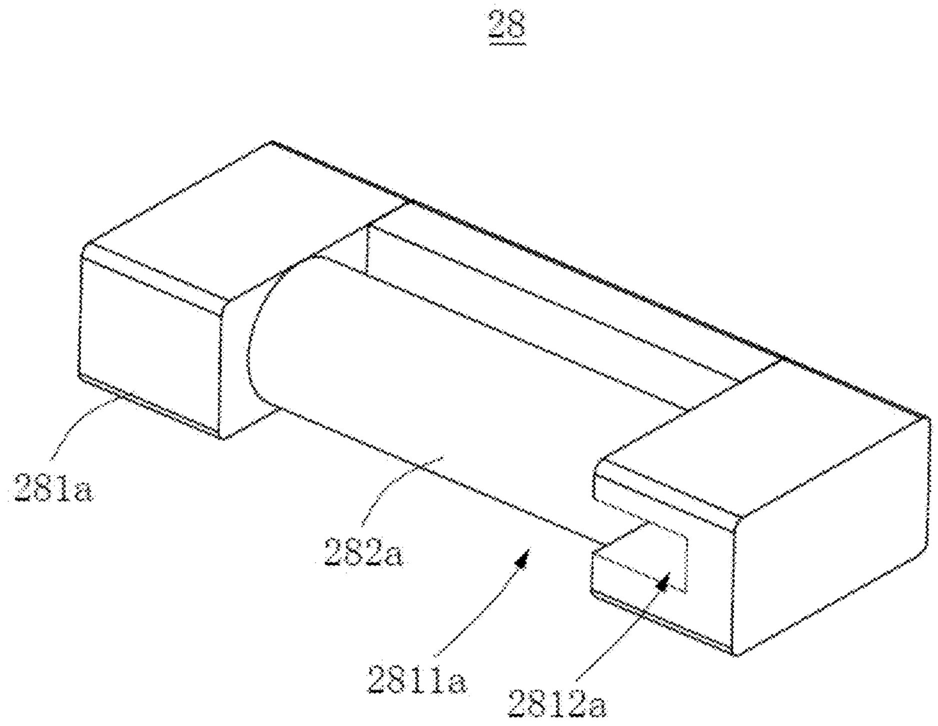
FIG. 16 is a perspective view of a buckle.
Figure 17:
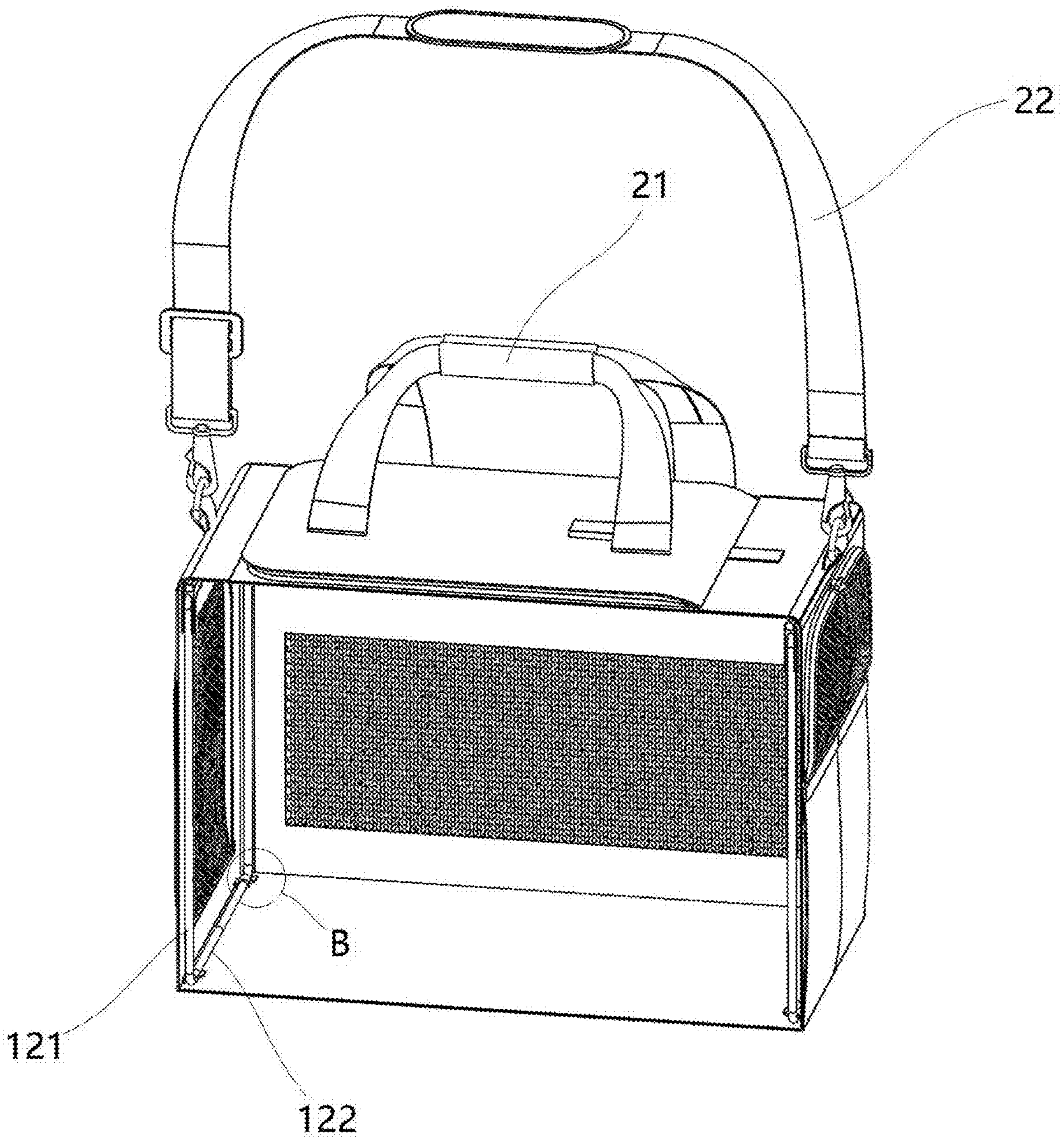
FIG. 17 is an internal structure diagram of the pet carrier.
Figure 18:
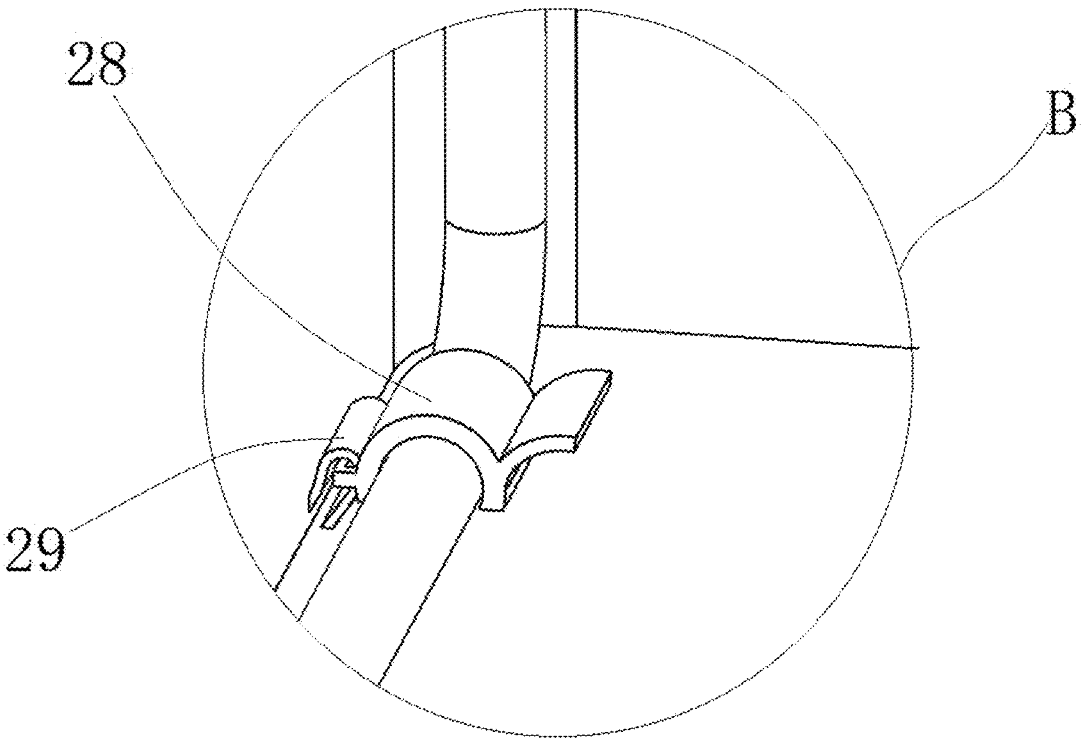
FIG. 18 is an exploded diagram of a part of the second link rod in FIG. 17.
Figure 19:
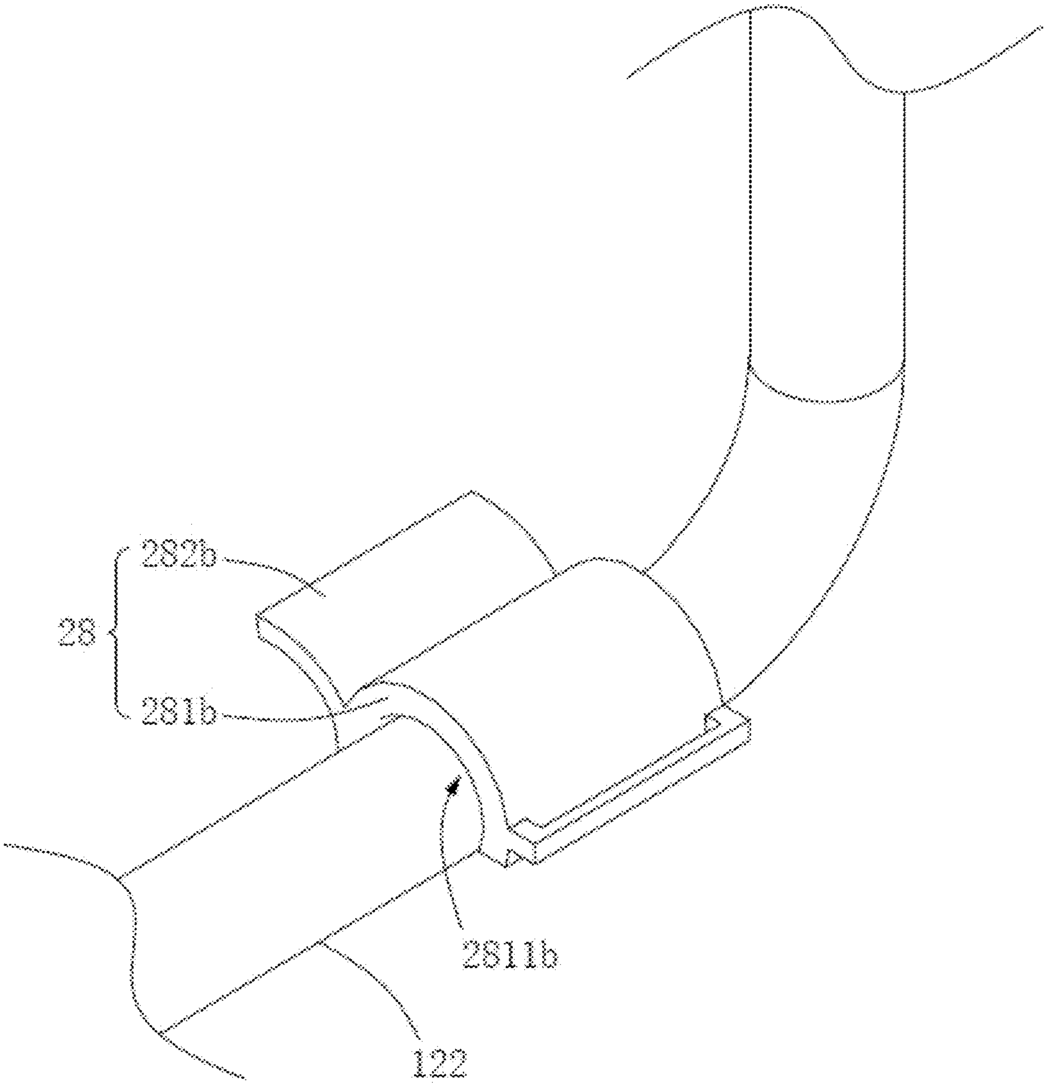
FIG. 19 is a perspective view of the buckle and the horizontal rod according to another embodiment of the present disclosure.
Figure 20:
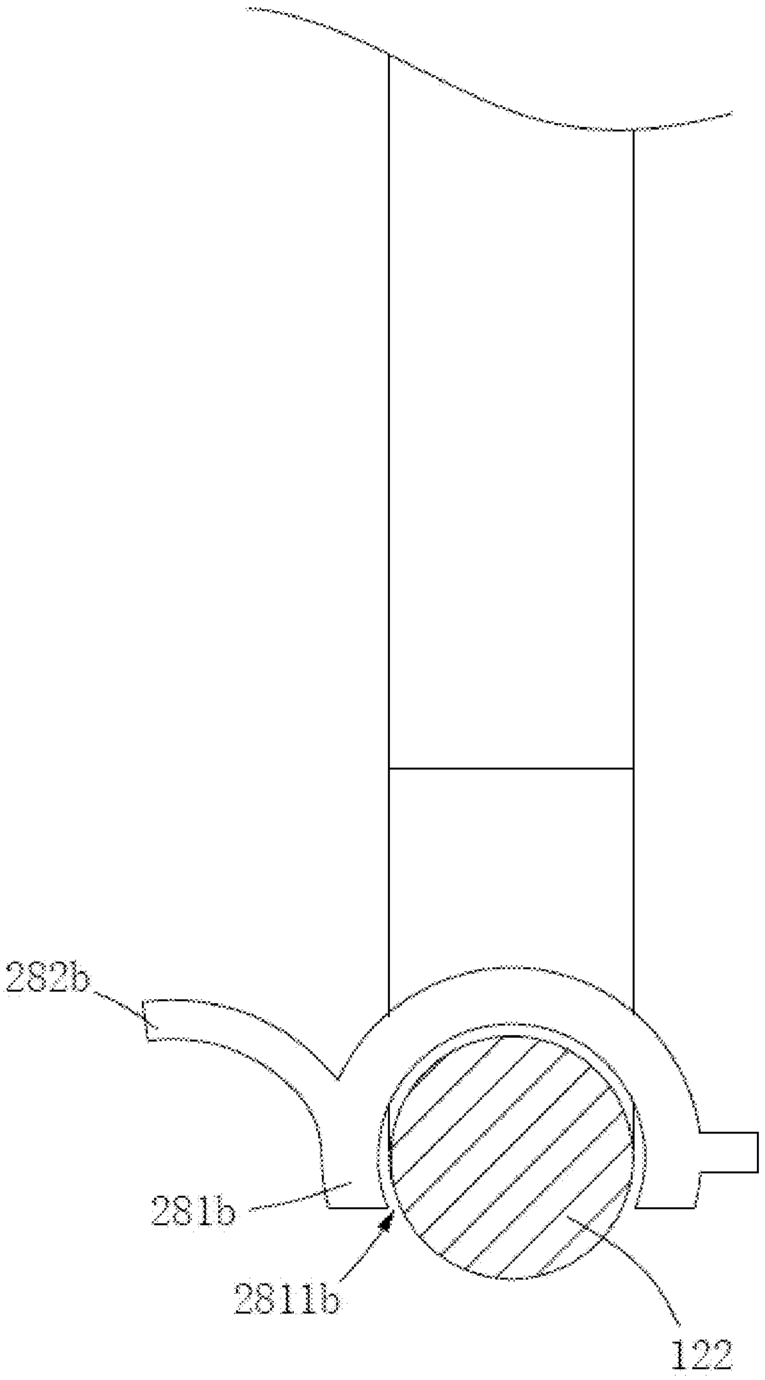
FIG. 20 is a side view of the buckle and the horizontal rod in FIG. 19.

Please refer to FIG. 16, which shows a perspective view of a buckle.

In some embodiments, the outer body 20 includes a buckle 28. When the supporting frames 12 are in the unfolded state, the limiting block 15 can connect with the buckle 28. Furthermore, the buckle 28 is connected to the inner side of the outer body 20 by a connecting strap 29.

Specifically, the limiting groove 151 of the limiting block 15 engages with the buckle 28, establishing a connection between the bracket 10 and the outer body 20 (as shown in FIG. 14).

Please further referring to FIG. 11, in some embodiments, the buckle 28 includes a connecting block 281*a* and a stucking rod 282*a*. The connecting block 281*a* connects to the inner part of the outer body 20 and is provided with an accommodating groove 2811*a*. The stucking rod 282*a* is placed within the accommodating groove 2811*a*, and the limiting block 15 cooperates with the stucking rod 282*a*.

The stucking rod 282*a* can snap into the limiting groove 151 of the limiting block 15, thus connecting the buckle 28 with the limiting block 15. Optionally, the material of the limiting block 15 may be plastic, allowing the limiting block 15 to elastically deform so that the stucking rod 282*a* can snap into the limiting groove 151.

In some embodiments, the connecting block 281*a* is provided with a positioning slot 2812*a*, which faces the side of the bracket 10. When the stucking rod 282*a* snaps into the limiting groove 151, both the first positioning block 152 and the second positioning block 1221 fit into the positioning slot 2812*a*, enhancing the stability of the bracket 10.

It should be noted that the connection method between the bracket 10 and the outer body 20 is not limited to connecting through the buckle 28 and the limiting block 15.

Please refer to FIGS. 17 to 20, in some embodiments, the limiting block 15 is not used, and the buckle 28 is directly connected to the horizontal rod 122 of the supporting frames 12, thus connecting the frame with the outer body 20.

When the buckle 28 is directly connected to the horizontal rod 122, the buckle 28 is made of plastic, and the buckle 28 is provided with a connection groove 2811*b*. The horizontal rod 122 is snapped into the connection groove 2811*b*, establishing a connection between the buckle 28 and the horizontal rod 122.

In some embodiments, the buckle 28 includes a connecting part 281*b* and a pull tab 282*b*. The connection groove 2811*b* is located in the connecting part 281*b*, and the pull tab 282*b* is placed on one side of the connecting groove 2811*b*.

By providing the pull tab 282*b*, the user can more easily separate the connecting part 281*b* from the horizontal rod 122 and connect the connecting part 281*b*.

Optionally, the connecting groove 2811*b* is an arcuate slot with an arc greater than 180°, allowing it to securely fit onto the horizontal rod 122.

In some embodiments, the number of buckles 28 is four, with two buckles positioned on the inner bottom side of the outer body 20, with each pair of buckles 28 connecting to one supporting frame 12.

In summary, the embodiments of the present disclosure provide a bracket 10, and a pet carrier 100 that includes the bracket 10. The rotating connection between the supporting frames 12 and the connecting frame 11, allowing the supporting frames 12 to fold, thereby facilitating the storage of the pet carrier 100. Additionally, by configuring the limiting block 15 to cooperate with the outer body 20 and the connecting frame 11, the supporting frames 12 can remain stable when in both the unfolded state and folded state.

It should be noted that in the description of the present disclosure, unless specifically stated otherwise, terms like "set," "installed," "connected," and "linked" should be broadly interpreted. These terms can refer to fixed connections, detachable connections, or integral connections; they can refer to mechanical connections, electrical connections, direct connections, or indirect connections via intermediary elements, and can refer to communication between elements within a component. Those skilled in the art can understand the specific meanings of these terms in the context of the present disclosure.

Also, terms such as "first," "second," etc., used in this disclosure for relational purposes are merely for distinguishing one entity or operation from another and do not necessarily imply any specific relationship or order between them. Moreover, the term "include," "comprise," or any of their variants are meant to cover non-exclusive inclusions, meaning that a process, method, item, or apparatus that includes a series of elements not only includes those elements but also includes other elements that are not explicitly listed, or those inherent to the process, method, item, or apparatus. Without further restrictions, elements defined by the phrase "comprising a . . . " do not exclude the presence of other identical elements in the process, method, item, or apparatus that include the specified elements.

Although the embodiments of the present disclosure have been shown and described, it is understood by those skilled in the art that various modifications, changes, substitutions, and variations may be made without departing from the principles and spirit of the disclosure. The scope of the disclosure is defined by the appended claims and their equivalents.

What is claimed is:

1. A bracket for a pet carrier, the bracket for a pet carrier is placed inside an outer body of the pet carrier to support the outer body, comprising a connecting frame and two supporting frames;

wherein the connecting frame is configured to support the outer body;

one of the supporting frames is rotatably connected to one side of the connecting frame, and the other one of the supporting frames is rotatably connected to another side of the connecting frame;

the supporting frames have a folded state and an unfolded state, when the supporting frames are in the unfolded state, they are configured to support the outer body;

wherein the bracket for the pet carrier further comprises a connecting part, the connecting part is configured to connect the supporting frames and the connecting frame;

wherein the bracket for the pet carrier further comprises a fixing part;

wherein the fixing part is slidably connected to the connecting frame; and the fixing part is provided with a first slot and a second slot; and when the supporting frames are in the unfolded state, the fixing part slides toward the connecting part, making the first slot engage with the connecting part to restrict a rotation of the supporting frames; and when the first slot is separated from the connecting part, the rotation of the supporting frames is no longer restricted; and when the supporting frames are in the folded state, the fixing part slides toward the connecting part, making the second slot engage with the connecting part to restrict the rotation of the supporting frames; and when the second slot is separated from the connecting part, the rotation of the supporting frames is no longer restricted.

2. The bracket for the pet carrier according to claim 1, wherein a top connecting hole is defined on the connecting part, the connecting frame is threaded through the top connecting hole; and a side connecting hole is also defined on the connecting part, in which at least part of each of the supporting frames is located.

3. The bracket for the pet carrier according to claim 2, wherein an upper side of the connecting part is penetrated by the top connecting hole, making the connecting part detachably connect with the connecting frame.

4. The bracket for the pet carrier according to claim 1, wherein a length of the bracket for the pet carrier is adjustable according to at least one direction along its length, width, or height.

5. The bracket for the pet carrier according to claim 1, wherein the connecting frame comprises two first link rods and two second link rods;

wherein the two first link rods are arranged in parallel; and the two second link rods are arranged in parallel, with a first end of each of the two second link rods is connected to one of the two first link rods, and a second end of each of the two second link rods is connected to the other of the two first link rods;

wherein the second link rods are connected to the supporting frames.

6. The bracket for the pet carrier according to claim 5, wherein each of the two second link rods comprises a first section, a second section, and an elastic limiting member;

wherein the first section is slidably connected to the second section, the second section is sleeved around the first section, and the elastic limiting member is disposed inside the first section and at least partially extends from the first section to resist the second section, thereby limiting a relative position of the first section and the second section.

7. The bracket for the pet carrier according to claim 5, wherein the second link rod comprises:

a middle section, two ends of which are provided with threaded portions;

two of side sections, wherein one of the side sections is threadedly connected to one of the threaded portions of the middle section, and the other one of the side sections is threadedly connected to the other one of the threaded portions of the middle section, to adjust a length of the second link rod.

8. The bracket for the pet carrier according to claim 1, wherein the bracket for the pet carrier further comprises a limiting block;

wherein the limiting block is connected to one of the supporting frames; and when the supporting frames are in the unfolded state, the limiting block is configured to connect to the outer body; and when the supporting frames are in the folded state, the limiting block is connected to the connecting frame.

9. The bracket for the pet carrier according to claim 8, wherein the connecting frame comprises a third link rod, when the supporting frames are in the folded state, the limiting block is connected to the third link rod.

10. The bracket for the pet carrier according to claim 8, wherein the limiting block is provided with a limiting groove, which is configured to cooperate with the outer body and the connecting frame; and the limiting block is rotatably connected to one of the supporting frames, wherein the limiting groove is configured to face toward one of: the outer body and the connecting frame.

11. The bracket for the pet carrier according to claim 10, wherein one side of the limiting block is provided with a first positioning block, when the limiting groove cooperates with the outer body, the first positioning block also cooperates with the outer body to limit the rotation of the limiting block.

12. The bracket for the pet carrier according to claim 11, wherein each of the supporting frames is provided with a second positioning block, when the supporting frames are in the unfolded state, and the limiting groove faces the outer body, the second positioning block is attached to the first positioning block, and both the first positioning block and the second positioning block cooperate with the outer body.

13. A pet carrier, comprising an outer body, wherein the pet carrier further comprises a bracket for the pet carrier, which is detachably installed inside the outer body;

wherein the bracket for a pet carrier is placed inside an outer body of the pet carrier to support the outer body, comprising a connecting frame and two supporting frames;

wherein the connecting frame is configured to support the outer body;

one of the supporting frames is rotatably connected to one side of the connecting frame, and the other one of the supporting frames is rotatably connected to another side of the connecting frame;

the supporting frames have a folded state and an unfolded state, when the supporting frames are in the unfolded state, they are configured to support the outer body;

wherein an inner part of the outer body is provided with a buckle, which is detachably connected to one of the supporting frames;

wherein the buckle is provided with a connecting groove, the connecting groove is connected to one of the supporting frames;

wherein the buckle comprises a connecting part and a pull tab, the connecting groove is set in the connecting part and the pull tab is positioned on one side of the connecting groove.

14. The pet carrier according to claim 13, wherein the bracket for the pet carrier comprises a limiting block, the limiting block is provided on one of the supporting frames;

when the supporting frames are in the unfolded state, the limiting block is connected to the buckle, and one of the supporting frames is detachably connected to the buckle via the limiting block.

15. The pet carrier according to claim 14, wherein the buckle comprises a connecting block and a stucking rod;

wherein the connecting block is connected to an inner part of the outer body; and an accommodating slot is defined on the connecting block, and the stucking rod is accommodated in the accommodating slot, with the limiting block cooperating with the stucking rod.

* * * * *